(12) United States Patent
Ritter et al.

(10) Patent No.: US 9,928,220 B2
(45) Date of Patent: Mar. 27, 2018

(54) TEMPORARY HIGHLIGHTING OF SELECTED FIELDS

(71) Applicants: Gerd Ritter, Heidelberg (DE); Guenter Wilmer, Mannheim (DE)

(72) Inventors: Gerd Ritter, Heidelberg (DE); Guenter Wilmer, Mannheim (DE)

(73) Assignee: SAP SE, Walldorf (DE)

( * ) Notice: Subject to any disclaimer, the term of this patent is extended or adjusted under 35 U.S.C. 154(b) by 830 days.

(21) Appl. No.: 13/919,954

(22) Filed: Jun. 17, 2013

(65) Prior Publication Data

US 2014/0372863 A1    Dec. 18, 2014

(51) Int. Cl.
*G06F 17/24*   (2006.01)
*G06F 17/21*   (2006.01)
*G06F 17/25*   (2006.01)

(52) U.S. Cl.
CPC ................... *G06F 17/218* (2013.01)

(58) Field of Classification Search
CPC .................................................... G06F 17/241
USPC ........................................................ 715/231
See application file for complete search history.

(56) References Cited

U.S. PATENT DOCUMENTS

| | | | |
|---|---|---|---|
| 6,411,313 B1* | 6/2002 | Conlon et al. | 715/769 |
| 6,820,237 B1* | 11/2004 | Abu-Hakima | G06F 17/218 715/210 |
| 7,752,092 B1* | 7/2010 | Mattice et al. | 705/30 |
| 2002/0023105 A1* | 2/2002 | Wisniewski | 707/503 |
| 2006/0003306 A1* | 1/2006 | McGinley et al. | 434/350 |
| 2008/0178117 A1* | 7/2008 | Gelman et al. | 715/808 |
| 2008/0184102 A1* | 7/2008 | Selig | G06F 17/243 715/234 |
| 2011/0225485 A1* | 9/2011 | Schnitt | G06F 17/243 715/222 |

OTHER PUBLICATIONS

Chester et al., "Mastering Excel 97, Fourth Edition", 1997; SYBEX pp. 139-141; 910-911; 920.*
Kankuzi et al., "An End-User Oriented Graph-Based Visualization for Spreadsheets", ACM, 2008, pp. 86-90.*

* cited by examiner

*Primary Examiner* — James J Debrow
(74) *Attorney, Agent, or Firm* — Klarquist Sparkman, LLP (57) ABSTRACT

Approaches are presented for temporary highlighting of selected fields of a document. For example, a user can select which fields of a document or class of documents he wishes to have highlighted. The user can also select (a) when he wishes the selected fields to be highlighted, for example, if a field exceeds a threshold and/or (b) how he wishes the selected fields to be highlighted, e.g., overlay the field with a contrasting color. When the user performs a specified action, for example, opens a document, the selected field is selectively highlighted according to the rules for when and how to highlight the selected field. This can help a user quickly recognize important fields in the context of the document.

24 Claims, 10 Drawing Sheets

Customer OnDemand

| | FEED | EMPLOYEES | PRODUCTS | TAGS | SHELF |

Overview | Feed | Products | Sales | Activities | Sales Team

OPPORTUNITY
OS

LATEST UPDATES

Account: Arctic Fox Campers C2003

Name: OS
Primary Contact:
Source: Open
Reason for Status:
Approval Status: Not Started

Progress: Slow

SALES TEAM

| Role | Name |
| Sales Employee | John Doe |
| Sales Employee | Allison Smith |

PRODUCTS

CONTACTS

| Role | Name | Primary Contact |
| No Records Found | | |

NOTES

TEMPORARY HIGHLIGHTING OF SELECTED FIELDS

BACKGROUND

Highlighted text (e.g., bold, italicized, colored, enlarged, etc.) is commonly used to emphasize fields in documents. This highlighting allows a user to identify and grasp important or relevant fields quickly. Business documents such as sales quotes, service requests, leads, and invoices are frequently opened and used by users, and important fields in these documents, e.g., account, contact, or product information, need to be identified quickly by the user. Highlighted text allows these important fields to stand out, and thus, be recognized quickly in these business documents.

In some documents, a static highlight may be used to identify an important field. For example, a field with status information may be shown in red or a person's name may be bolded in a document to identify the important fields. Alternatively, a pop-up window, such as one used, for example, when a new email message is received, may also be used to alert a user to the important fields. Other variations of static highlights and pop-up windows are available to provide highlighting of fields in documents.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Techniques and tools are described for temporary highlighting of selected fields in a document. For example, a user can select which fields in a document are important or relevant, when to display the selected fields, and how the selected fields are presented. These options may be saved so that, for example, when a user opens the document or moves a pointer of a graphical user interface over a selected field or location, the selected fields are temporarily highlighted. This can help an end user quickly recognize important fields in the context of the document.

One aspect of an embodiment is a method of configuring automated highlighting of selected fields of a document. The method includes selecting one or more fields to be highlighted; assigning one or more rules for the selected fields, the assigned rules specifying how the selected fields are to be highlighted for a temporary duration; and saving the selected fields and assigned rules.

Another aspect of an embodiment is a method of highlighting selected fields of a document. The method includes retrieving one or more rules specifying how to highlight one or more fields; when a specified action occurs, selectively highlighting the one or more fields according to the one or more rules, where the one or more fields are selectively highlighted for a temporary duration; and after the temporary duration has ended, un-highlighting any of the one or more fields that were highlighted according to the one or more rules.

Another aspect of an embodiment is a computer-readable medium storing computer-executable instructions for causing a processor programmed thereby to perform the method of configuring automated highlighting of selected fields of a document and/or the method of highlighting selected fields of a document described above.

Another aspect of an embodiment is a computing device adapted to perform the method of configuring automated highlighting of selected fields of a document and/or the method of highlighting selected fields of a document described above.

The foregoing and other objects, features, and advantages will become more apparent from the following detailed description, which proceeds with reference to the accompanying figures.

DETAILED DESCRIPTION

Example 1—Exemplary Overview

The following description is directed to techniques and solutions for temporary highlighting of selected fields of a document. For example, a user can select which fields of a document or class of documents he wishes to have highlighted. The user can also select (a) under what conditions he wishes the selected fields to be highlighted, for example, if a field exceeds a threshold, and/or (b) how he wishes the selected fields to be highlighted, e.g., overlay the field with a contrasting color. In addition, the user can select in what order he wishes the selected fields to be highlighted. When the user performs a specified action, for example, opens a document, the selected field is selectively highlighted according to the rules for highlighting the selected field.

The ability to temporarily highlight a field in a business document is helpful to a user. Generally, a highlight for a field emphasizes that field, but if that highlight is static, it may become distracting to the user. Further, if the highlight obscures other fields, or a pop-up window appears, it may interfere with the viewing of other fields and otherwise limit visibility of the fields and use of the document. On the other hand, a temporary highlight allows a field to be highlighted, but after a temporary duration, to be un-highlighted. Thus, it allows the user to view the selected information quickly, but otherwise does not distract him from viewing the remainder of the document unless he wishes to view the highlight again (by performing some specified action).

In any of the examples used herein, "document" can refer to any form, view, window or data object in which selected fields are present and may be highlighted. Documents are not limited to individual forms, views, and windows and may also refer to any tab, page, etc. of an application.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments can use one or more of the described innovations.

Example 2—Configuring Automated Highlighting of Selected Fields

Figure 1:
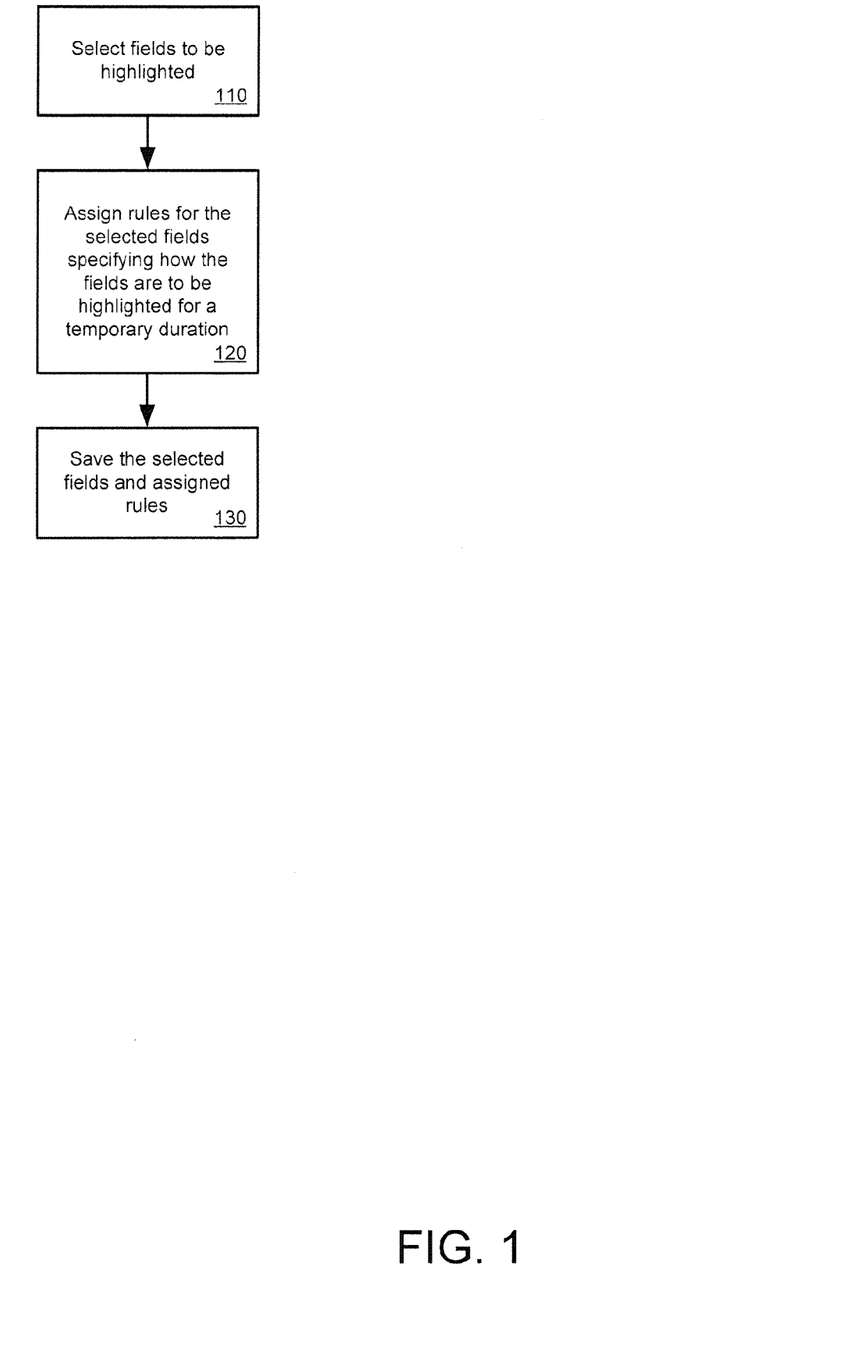
FIG. 1 is a flowchart of a generalized method of configuring automated highlighting of selected fields of a document.

FIG. 1 is a flowchart illustrating a generalized method of configuring automated highlighting of selected fields of a document. At 110, one or more fields of a document are selected to be highlighted. The selected fields may be determined by a company, a partner, a key user, and/or an end user. A key user is a user, such as an administrator or supervisor for a group of users, that may set and determine particular fields based on importance, use, or any other criteria established by the company, the partner and/or the end users. For different groups of users, different fields of the same document may be important, depending on the role of the group or status information in the document. The end users may also select the fields for highlighting. For example, a given end user may determine that account information is important. Therefore, the end user may select that field for temporary highlighting. In some implementations, however, such as in the case where a field is selected by someone other than the end user, the end user may also unselect a field for highlighting, i.e., the end user has ultimate control over which fields are to be highlighted. The determination of which fields are to be selectively highlighted is not limited to a company, partner, key user, and/or end user and may be performed by any other individual or entity that wants to selectively highlight fields in a document.

At 120, one or more rules are assigned for the selected fields specifying how the fields are to be highlighted. The rules may also be assigned by the company, partner, key user, end user or other entity. For example, if a rule for the user name is assigned, the field may be highlighted according to that rule. The rule may simply cause highlighting of any user name in a document, or it may cause highlighting of a specific user name based on additional rules. Further explanation of assigning the rules will be given below. When the fields are highlighted, they are highlighted for a temporary duration. The duration may be a default value or may also be set by the rules for the selected fields.

At 130, the selected fields and the assigned rules are saved. The selected fields and assigned rules can be saved as part of the settings for an application or class of documents. The selected fields and assigned rules may be saved on the user's machine, on a server in a local network, or in a database in a local network. The selected rules may also be saved on a server or database in a cloud computing environment.

Figure 2:
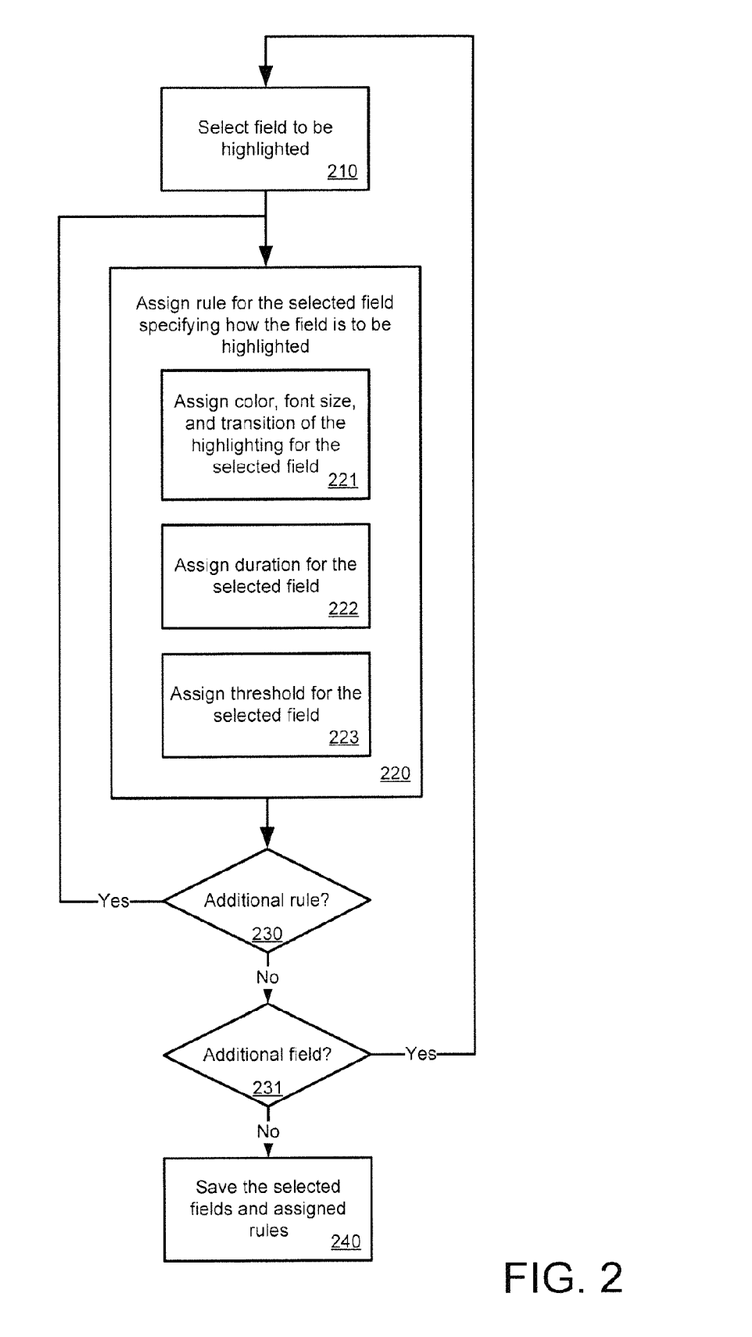
FIG. 2 is a flowchart of an example method of configuring automated highlighting of selected fields of a document.

FIG. 2 is a flowchart illustrating an example method of configuring automated highlighting of selected fields of a document. At 210, a field is selected. The selected field may be determined by the company, partner, key user, and/or end user as described above.

At 220, a rule is assigned for the selected field specifying how the field is to be highlighted. The rule can be assigned by the company, partner, key user, end user and/or other entity. Various properties of the highlighting can be set for the rule. For example, at 221, the color, font size, and/or transition behavior may be set by the rule for the highlighting of the field. The properties are not limited to those described above, however, and may include any properties that highlight the selected field. For example, the selected field may also be animated or bolded. Further, the color, font size, and transition behavior for highlighting need not be explicitly specified for the rule, and may use a default setting for the highlighting of the selected field. Further, for the transition behavior for highlighting, the transition in and the transition out may also be set or may use a default setting for the transition. At 222, the temporary duration for the selected field may be assigned. The temporary duration may have a default value, such as 5 seconds. The company, partner, key user, end user, etc. may also select a duration that is shorter or longer than the default duration depending on his preference. For example, if there are many fields to be highlighted, a user may set the duration to be longer in order to have more time to view all of the highlighted fields. In another embodiment, the highlighting may be set in order to highlight the selected fields in a predetermined order. For example, the first highlighted field may be highlighted for 5 seconds, and then the next highlighted field is highlighted for 5 seconds, etc. The duration, the order in which to highlight, and the time between highlighting can be set by the company, partner, key user, end user, etc. The company, partner, key user, end user, etc. may also set up rules for the selected field to determine under what conditions the highlighting occurs. At 223, the company, partner, key user, end user, etc. may assign a threshold for the selected field. For example, if a user only wants values greater than a certain number to be highlighted, the user can set the highlighting rule to only highlight the field if the value of the field exceeds that number. Or, if the user only wants values less than a certain number to be highlighted, the user can set the highlighting rule to only highlight the field if the value of the field is less than the number. Similarly, the user can set the highlighting rule to only highlight an exact value, only highlight values within a specified range, or only highlight values when some other condition is satisfied for the values. For a date, the user can set the highlighting rule to only highlight a field if the date is past a deadline, is within a specified period of a deadline, or satisfies some other condition for the date. For any type of data, the rule can specify one or more conditions for values of a field under which the field is highlighted. In addition, the rule can specify one or more conditions for values of one or more other fields under which the specified field is highlighted. For example, if an "amount" field is greater than 10000 USD and a "country" field is equal to "France," the specified field may be highlighted.

At 230, the user may set an additional rule for the field. For example, the user may select more than one property for the highlighting of a field or select more than one threshold for the highlighting. In addition, additional conditions or criteria for the highlighting may also be set. At 231, the user may select an additional field for highlighting. The additional field may be set with the same rules as the previously selected field, may take the default rules for the document, class of documents, application, etc., or may be set with any rules determined by the company, partner, key user, end user, etc. At 240, the selected fields and the assigned rules are saved.

The selection of fields is not limited to individual fields and may be a class of fields. For example, all account information can be selected. In addition, a table or table columns may be selected. Further, the selection is not limited to fields and may be a value that the user wants to be highlighted whenever and wherever it appears. For example, if a user wishes for a specific person's name to be highlighted every time the user views a document, rules may be set for that person's name. Further, an image or graphic may be selected to be highlighted. For example, certain charts or types of charts may be selected. Also, certain images, classes of images, or types of images may also be selected. Any element of the document, class of documents, application, etc. may be selected to be highlighted.

Further, the rules are not limited to those described above. In addition, any combination of rules may be assigned for a field or a class of fields. Further, the rules may be set as a default set of rules or may be set for a group of fields. Thus, any combination of fields and rules may be set for the document, class of documents, application, etc.

The methods described above may be implemented in an application. For every document opened and/or used by the application, the application may be used to perform the methods described above for all documents the application renders. Alternatively, the methods described above may be implemented for a class of documents. For example, if a user would like all invoices to include the selective highlighting, fields may be selected and rules may be assigned for all invoices. The selected fields and assigned rules are not limited to a single class of documents, but instead may be applied to any classes or groups of documents as specified in the rules for the highlighting.

Example 3—Highlighting Selected Fields

Figure 3:
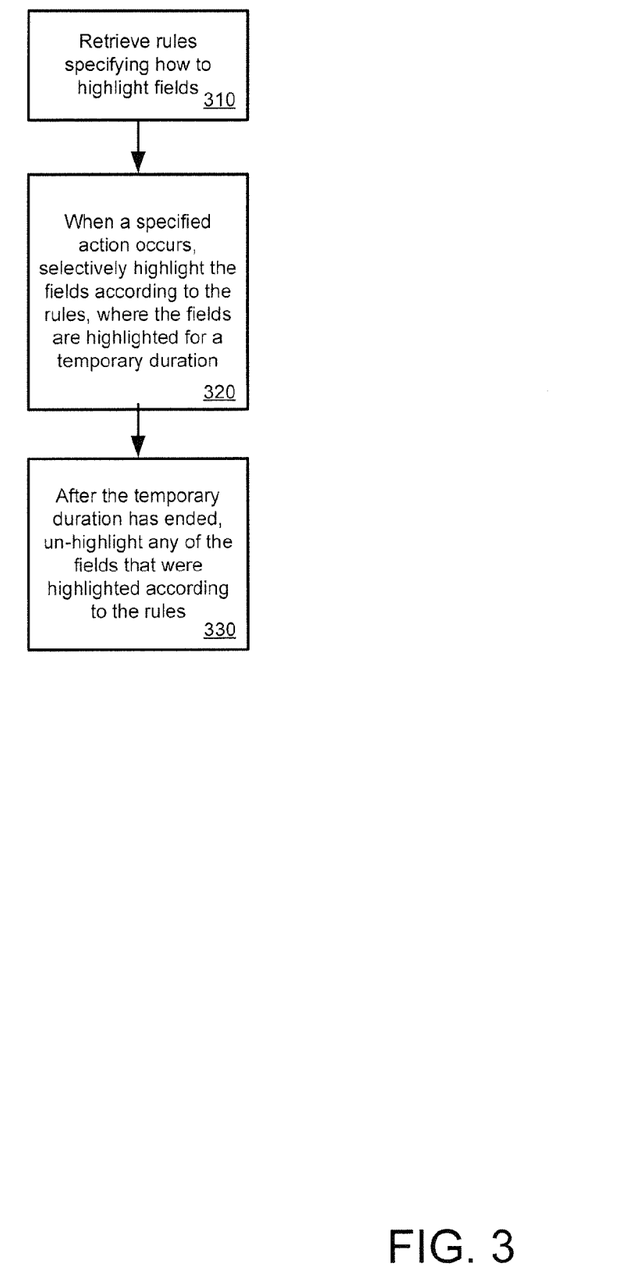
FIG. 3 is a flowchart of a generalized method of highlighting selected fields of a document.

FIG. 3 is a flowchart of a generalized method of highlighting selected fields of a document. At 310, one or more rules are retrieved specifying how to highlight fields. The rules may be set by the method described above or may be default rules specifying how to highlight the fields.

At 320, when a specified action occurs, the fields are selectively highlighted according to the rules. Examples of a specified action includes opening a document, switching a view, moving a pointer in the graphical user interface over a field, moving a pointer in the graphical user interface over a special icon or location to repeat the selective highlighting, and pressing one or more keys. The specified action is not limited to those actions described above, and may be any action specified by a user to trigger the selective highlighting according to the rules and/or default rules. The fields are selectively highlighted for a temporary duration. The rules that were retrieved at 310 may specify the duration of the highlighting or the duration may be a default value, e.g., 5 seconds. The rules may also specify in which order to highlight the fields or may highlight the field all at once. The highlighting may include displaying the selected fields with a larger font and/or bolded font. Additionally, the highlighting may include using a colored background for the field or changing the color of the field. The combinations are not limited to those described and may be any combination or single change that allows the selected text to become highlighted in the document.

At 330, after the temporary duration has ended, any of the fields that were highlighted according to the rules are un-highlighted. In the foregoing example, the highlighted fields are highlighted for a temporary duration. However, this temporary duration may be suspended by the user. For example, if a user keeps the pointer in the graphical user interface over a field, the highlighting may remain until the pointer is moved away from the field. Further, each field may be un-highlighted at different times depending on the temporary duration defined for that field and the order in which the highlighting occurs.

Figure 4:
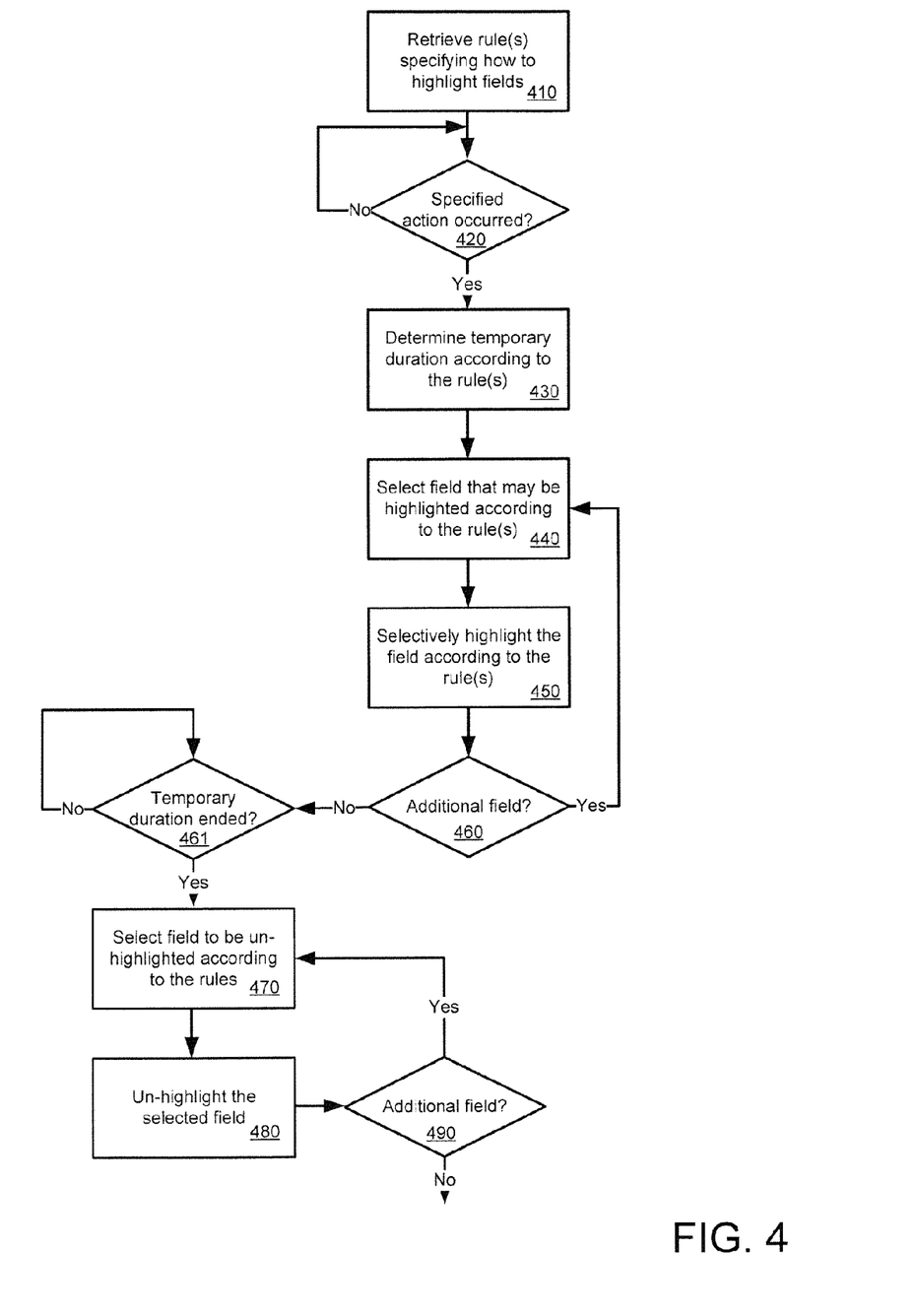
FIG. 4 is a flowchart of an example method of highlighting selected fields of a document.

FIG. 4 is a flowchart illustrating an example method of highlighting selected fields of a document. At 410, one or more rules are retrieved specifying how to highlight fields. The rules for which fields are selected can be determined by the method of configuring automated highlighting of selected fields described above.

At 420, the occurrence of a specified action is detected. If the action is among those actions that trigger the selective highlighting, according to the rules, at 430, a temporary duration for the highlighting is determined according to the rule(s). In FIG. 4, the same temporary duration applies for all of the selected fields and rules. Alternatively, different fields are highlighted for different temporary durations and/or different rules specify different temporary durations for highlighting. For example, the rules may specify an order in which the highlighting is to occur. Thus, the fields may be highlighted at different points of time, providing a sequence of highlighting.

At 440, a field is selected that may be highlighted according to the rules. At 450, the selected field is selectively highlighted according to the rules that apply for that field. Thus, the rules determine which fields are selected to possibly be highlighted and what properties of the highlighting are given to those fields. At 460, it is determined if any other fields are to be selectively highlighted. If so, the rules are applied for the next field. For example, when the rules are applied, it can be determined if the selected field has exceeded a threshold specified in the rules. If the selected field has not exceeded the threshold, the selected field is not highlighted. Otherwise, the field is highlighted for the temporary duration specified in the rules. Application of other rules can similarly involve comparison of a value of a field to a threshold or range of values to determine whether the field is to be highlighted.

At 461, it is determined if the temporary duration has ended. The temporary duration is determined (430) according to the rules. The rule may have a duration set by the user or a default duration. Further, each field may be un-highlighted at different times depending on the temporary duration defined for that field and the order in which the highlighting occurs.

At 470, if the temporary duration has ended, a field that was highlighted according to the rules is selected. At 480, the selected field is un-highlighted. At 490, it is determined if any other fields are to be un-highlighted. If so, a next field that was highlighted according to the rules is selected and un-highlighted.

Example 4—Exemplary User Interface for Highlighting Selected Fields

Figure 5:
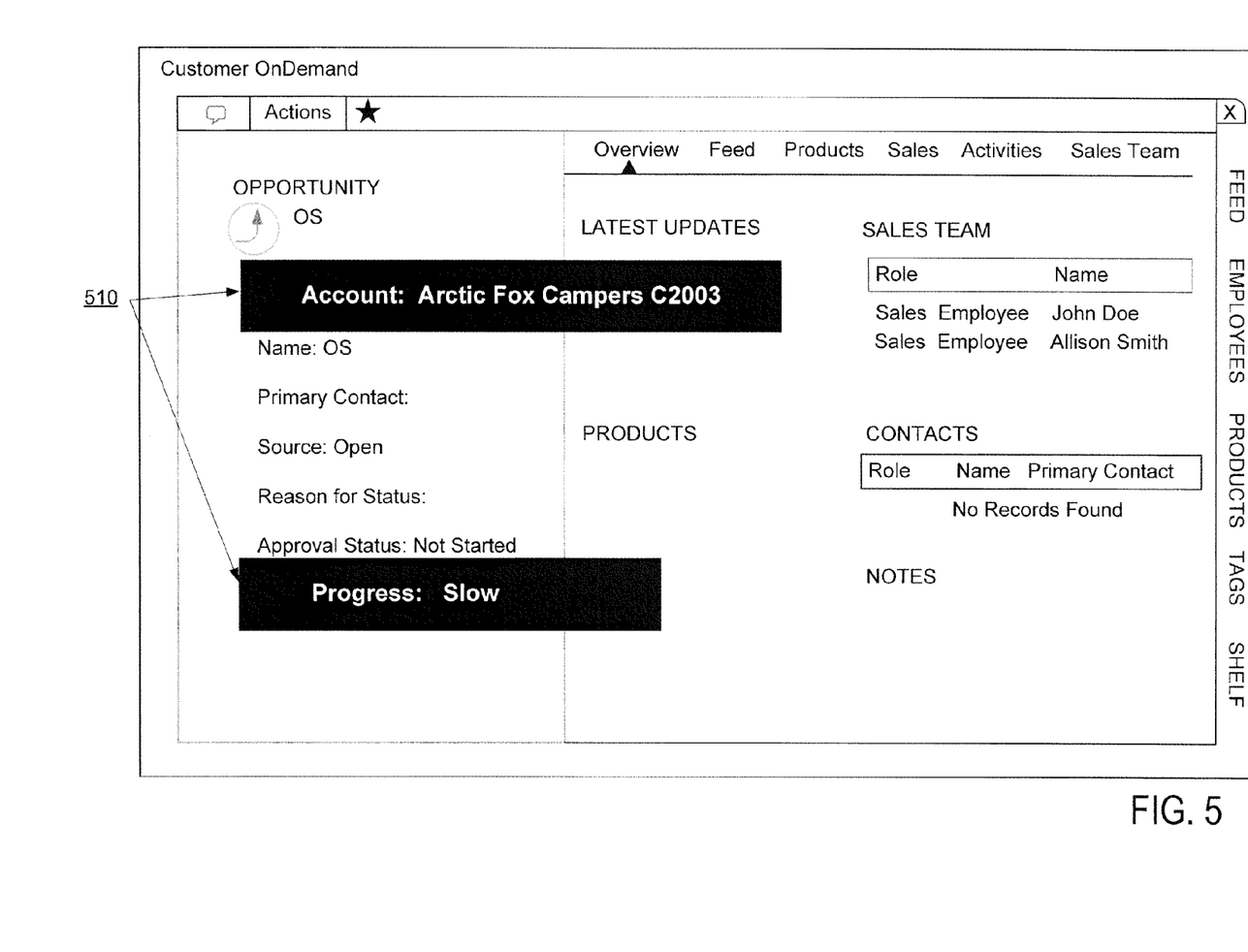
FIG. 5 is a diagram depicting an example user interface with selected fields of a document being highlighted.
Figure 6:
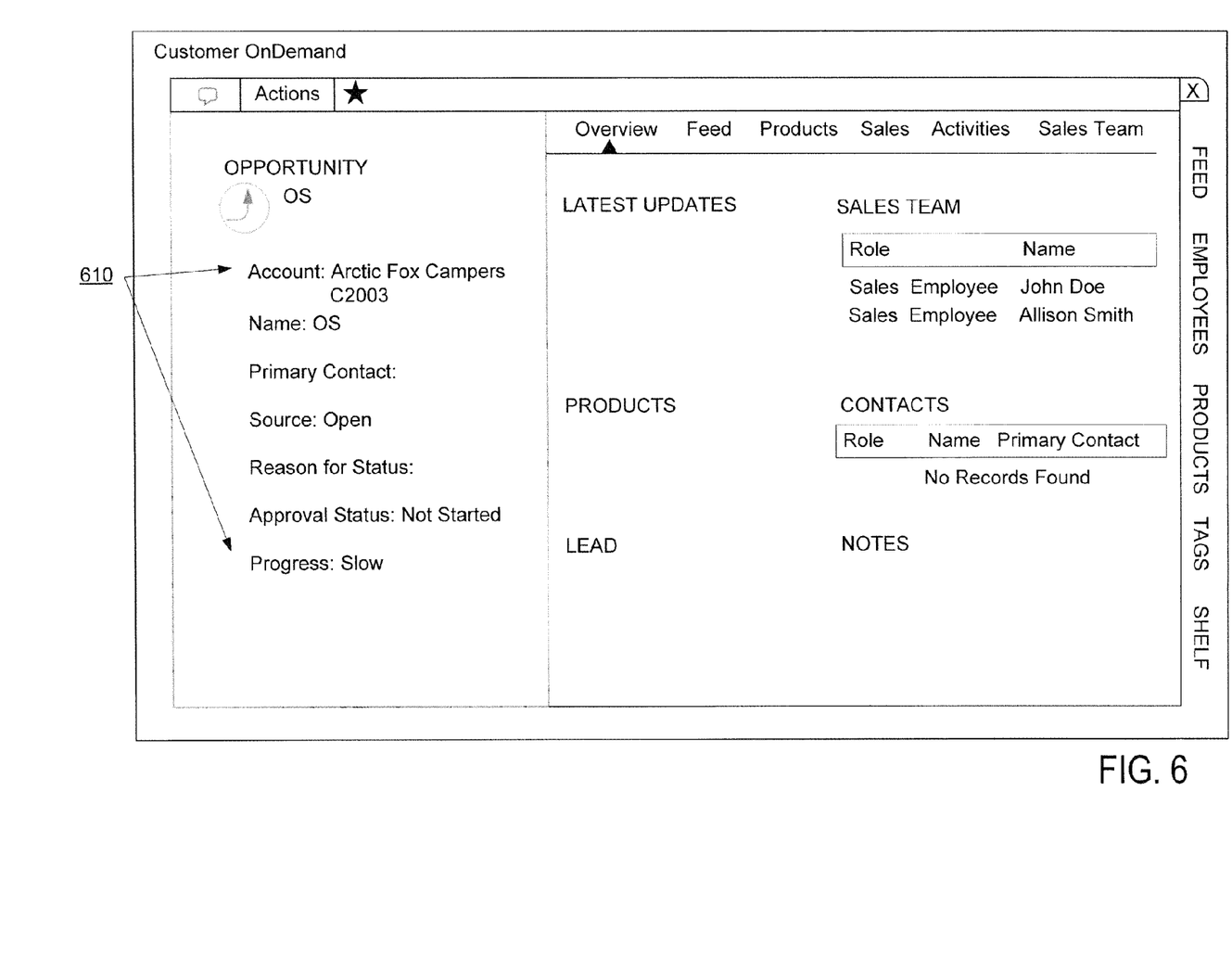
FIG. 6 is a diagram depicting the example user interface of FIG. 5 with the selected fields of the document being un-highlighted.

FIGS. 5 and 6 are diagrams depicting an example user interface showing the temporary highlighting of selected fields of a document. As shown in FIG. 5, account name for an account field and status information for a progress field (510) are highlighted. In this example, the highlighted fields are enlarged, bolded, and their background is a different color than the rest of the document. Thus, the highlight stands out from the document so that the user can detect the selected field quickly. However, the highlighting is not limited to being enlarged, bolded, and having a different color background, but instead may be set by the user to any combination desired to highlight the fields. Further, in this example, the fields are highlighted in a similar fashion. However, each field may have its own set of highlighting properties that may be selected by a user.

FIG. 6 displays the example user interface after the highlighting duration has ended. As shown in FIG. 6, the account name for the account field and status information for the progress field (610) are un-highlighted, i.e., the selected fields appear as regular text in line with other text and do not display any highlighting characteristics, aside from those that may already be present in the document. in this example, the account and progress fields no longer stand out from the document. Thus, the highlighting is only performed for a temporary period. However, in some embodiments, if the user places a pointer of the user interface over one of the selected fields or a special icon or location, the selected fields are again highlighted temporarily.

Figure 7:
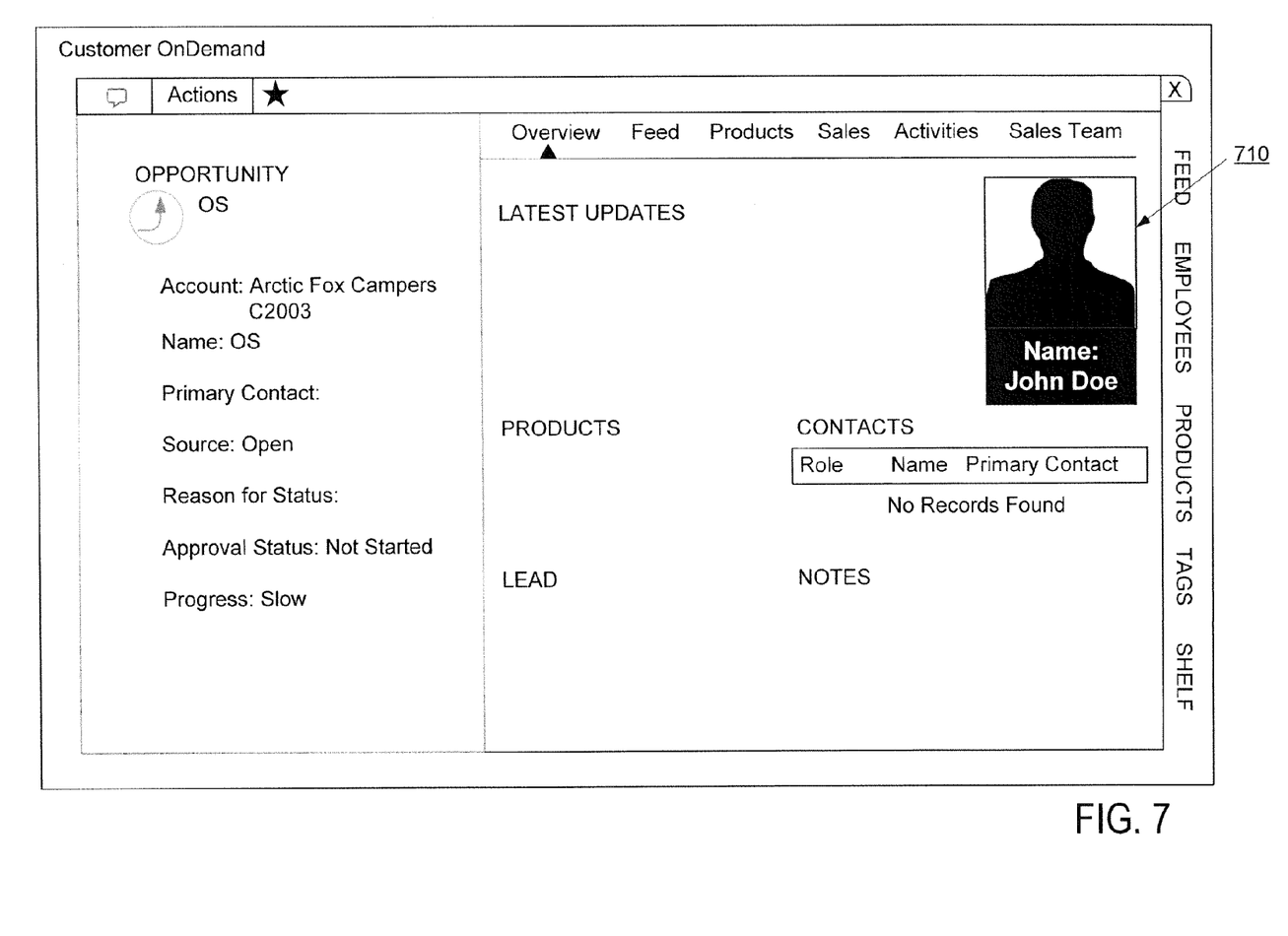
FIG. 7 is a diagram depicting an example user interface where the selected field is an image.

FIG. 7 displays the example user interface in which the selected field is an image. In this example, a person, John Doe, is selected to be highlighted. As shown in FIG. 7, an image 710 for John Doe is highlighted according to the rules for the field. As shown in FIG. 7, a name and image are both highlighted. However, in other embodiments, only the image or only the name may be highlighted. Further, if only the image is present in the document, the name may be generated as a rule for the highlighting.

Example 5—Exemplary User Interface for
Configuring Highlighting Data

Figure 8:
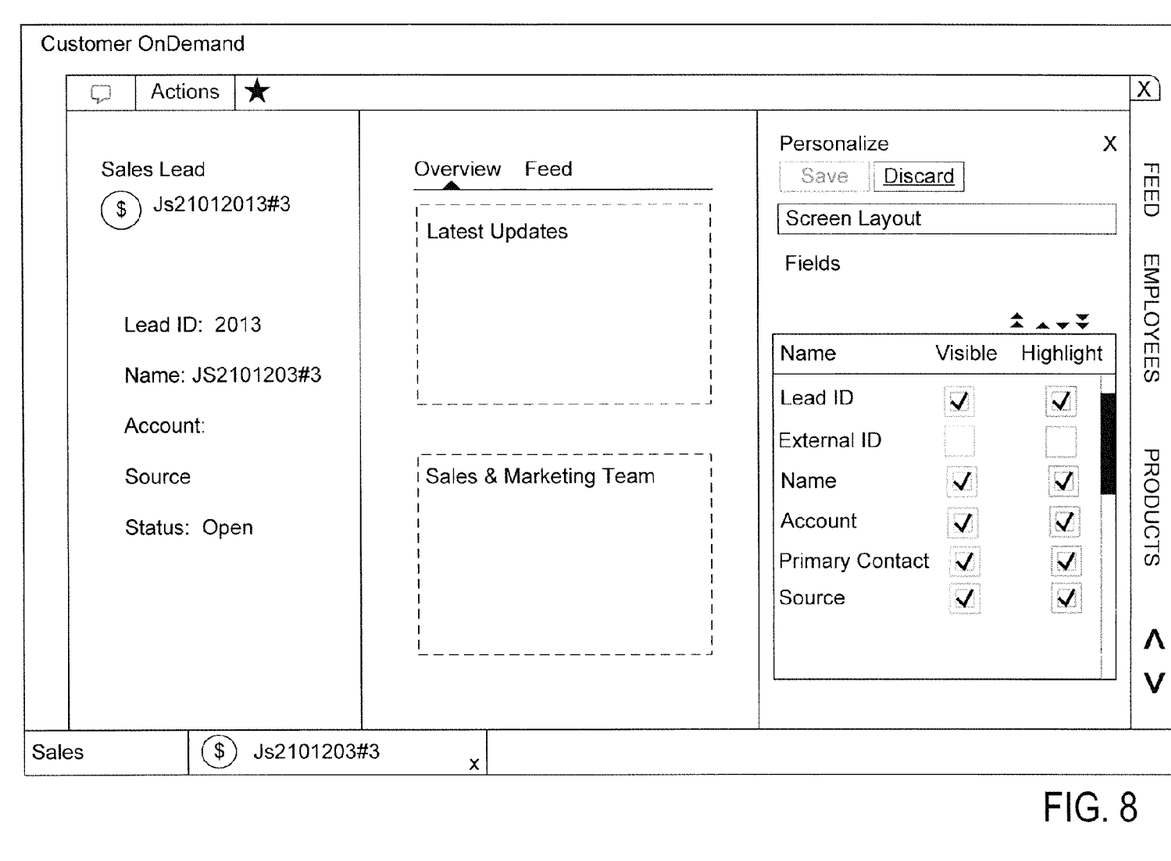
FIG. 8 is a diagram depicting an example user interface with a configuration box for setting the rules for the highlighting of the selected fields.

FIG. 8 depicts an example user interface showing a configuration box for setting rules for the highlighting of the selected fields. In this figure, a configuration box is provided with a list of selectable fields and checkboxes indicating which fields are to be highlighted. If a user checks one of the checkboxes, the corresponding field will be highlighted upon an occurrence of a specified event. The user may save the selections by, for example, pressing a save button. Alternatively, a user may revert to the previous saved setting and not save the selected options by, for example, pressing a discard button. Others ways to save and discard settings may be provided to the user.

Although FIG. 8 depicts a configuration box with only the option to highlight or un-highlight a field, additional options for the highlighting may be provided in the configuration box. For example, if a field is selected, additional options for setting rules for the highlighting or behavior of the highlighting may be provided. The additional option may be provided in the same configuration box or another configuration box. Alternatively, default or stored rules and durations may be saved for the document, class of documents or application, and the user may just be provided a list of fields that may be selected.

Rules for the highlighting are not limited to those set in the configuration box. For example, a separate program may be provided to highlight the selected fields of a document. In addition, a script or configuration file may be provided to specify or apply the rules for the highlighting. Any application or method that allows a user to select fields of a document and/or rules for the highlighting of fields may be used to perform the methods described herein.

The fields that are selected and the rules that are assigned may be for an application capable of rendering the document. Thus, for all documents rendered by the application, the highlighting may be applied. Alternatively, the fields that are selected and the rules that are assigned may be for a class of documents. Thus, for only that class of documents will the selected field be highlighted. The highlighting described herein is not limited to an application or class of documents and other options may also be provided for the highlighting. For example, documents from a specified sender may be highlighted. Further, a user may be provided the option to highlight a particular document by, for example, pressing a key or button.

Example 6—Exemplary Software Architecture

Figure 9:
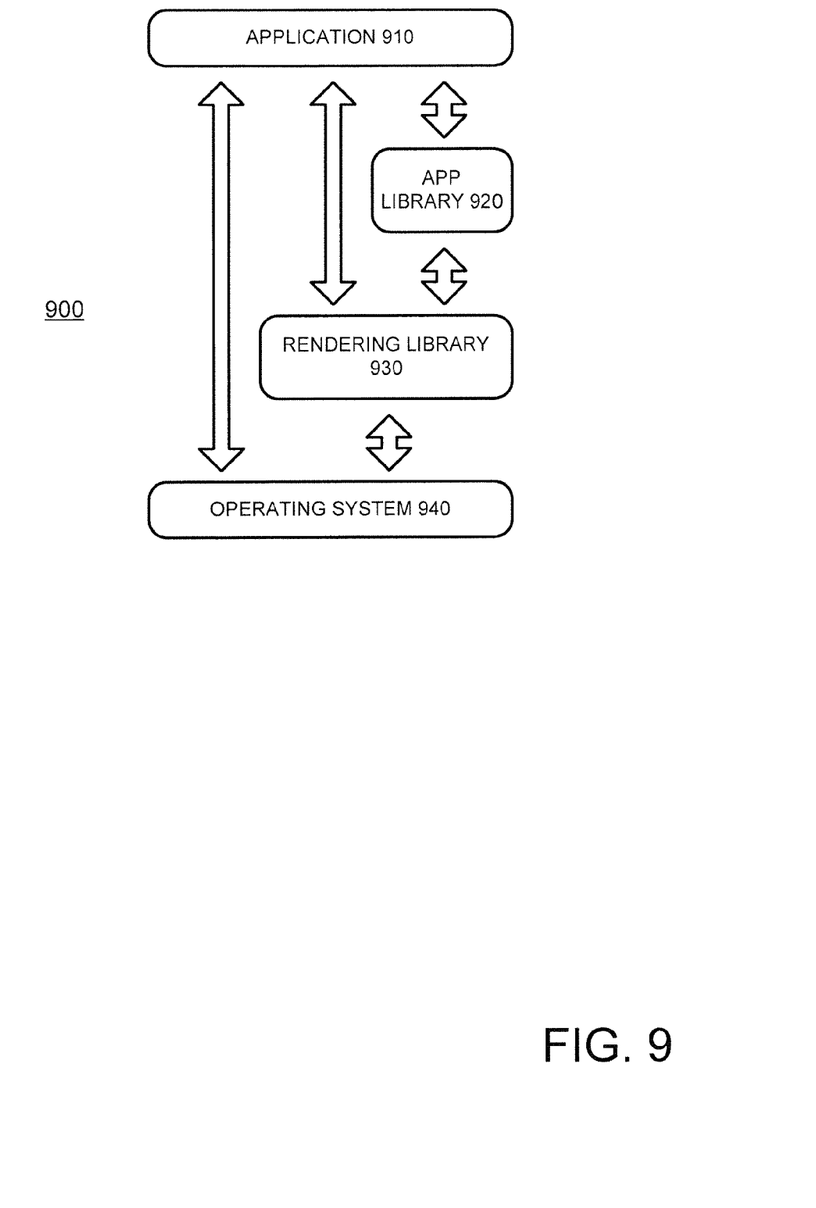
FIG. 9 is an example software architecture that can be used with any of the embodiments described herein.

FIG. 9 depicts an example software architecture (900) that includes an application (910), application library (920), rendering library (930), and operating system (940). The documents described herein can be rendered using the software architecture (900).

The application (910) is software that provides functionality to a user. For example, the application (910) may be a Web browser, a contact organizer, a database application or any other software that provides functionality to a user. In FIG. 9, the application (910) uses services provided by the application library (920), the rendering library (930), and the operating system (940).

The application library (920) implements functionality for the application (910) that is common to multiple applications. In this way, the multiple applications can reuse the same library (920). In FIG. 9, the application library (920) provides services to the application (910) and uses services provided by the rendering library (930). The application library (920) can also use services provided by the operating system (940).

The rendering library (930) provides services to the application (910) and application library (920), and the rendering library (930) uses services provided by the operating system (940). In example implementations, the rendering library (930) implements a rendering engine for highlighting selected fields of a document. The rendering library (930) can implement a programming interface that is exposed to the application (910) and/or application library (920). The application (910) and/or application library (920) can call the programming interface to cause selective highlighting of selected fields of a document according to one or more rules.

The operating system (940) provides services to the application (910), application library (920), and rendering library (930). The operating system (940) can be an operating system adapted for a mobile computing device or other operating system. One or more modules in the operating system (940) convert user input from a touchscreen, directional buttons on a keypad or keyboard, trackball, microphone or other input device into recognized UI events (e.g., a button click), gesture messages (e.g., in response to a panning or flick gesture by the user interacting with a touchscreen), navigation messages or other information that can be used in UI rendering. The operating system (940) can provide such events, messages, etc. to the application (910), application library (920) and rendering library (930). The events, messages, etc. generated in response to user input are translated into direct UI manipulation events for UI elements being rendered.

Within the rendering library (930) and/or operating system (940), one or more modules receive a markup language specification or other declarative description of a form or other document. For example, the specification of the document is received from the application (910). Generally, a declarative description includes information that defines UI elements. The declarative description can be provided to a markup generator, along with other information such as style information and/or configuration properties, and the markup generator generates markup language that can be used to render the UI elements. The markup generator can apply the one or more rules that control how to highlight fields of the document. For layout, UI rendering requests are generated from the markup language description as well as direct UI manipulation events and other commands. The rendering library (930) and/or operating system (940) include one or more modules for laying out UI elements for rendering. The operating system (940) includes one or more modules for receiving rendering requests and causing a rendered UI to be output for display.

Alternatively, the software architecture (900) includes more or fewer layers. For example, a given layer can be split into multiple layers, or different layers can be combined into a single layer. Functionality described with reference to one layer (e.g., rendering functionality, application of rules that control highlighting of fields) can in some cases be implemented as part of another layer. For example, the application of the rules that control highlighting of fields can be implemented in part or entirely in the application (910), application library (920) or operating system (940).

Example 7—Exemplary Computing Environment

Figure 10:
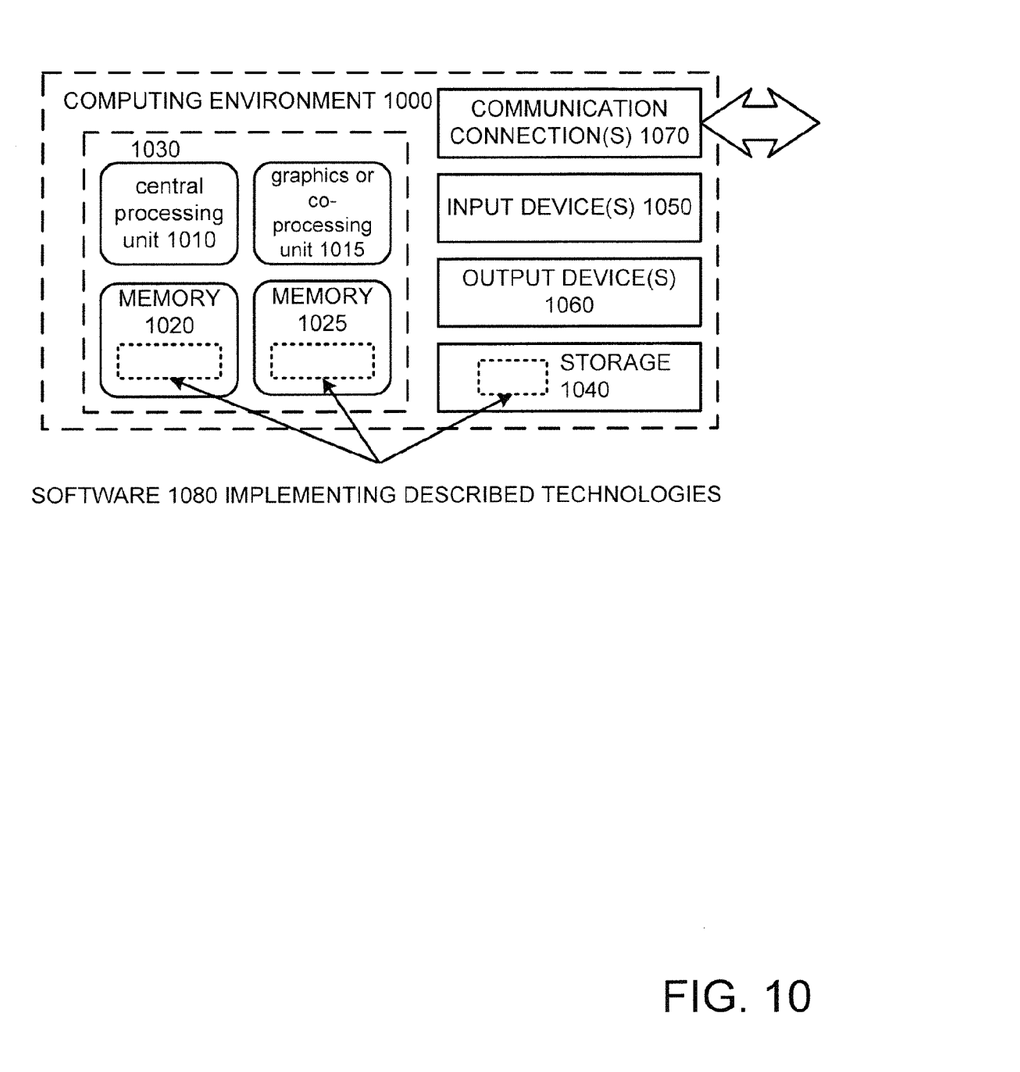
FIG. 10 is an example computing environment that can be used with any of the embodiments described herein.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, media player, gaming system, mobile device, etc.).

With reference to FIG. 10, the computing environment 1000 includes one or more processing units 1010, 1015 and memory 1020, 1025. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device (s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, specification for documents, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include signals or carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of configuring automated highlighting of a value at least one selected field of a document comprising:
   generating a user interface providing access to a plurality of data fields for each of a plurality of document classes, the plurality of data fields capable of being designated to be temporarily highlighted;
   receiving user input through the user interface selecting a first document class of the plurality of document classes;
   retrieving a first plurality of fields associated with the selected first document class;
   displaying at least a portion of the first plurality of fields;
   receiving user input through the user interface selecting at least a first field of the first plurality of fields to be highlighted for a first temporary duration in the selected first document class, wherein the at least a first field is displayed un-highlighted after expiration of the first temporary duration;
   saving an indication of the temporary highlighting of the at least a first field for the first document class;
   receiving user input through the user interface selecting a second document class of the plurality of document classes;
   retrieving a second plurality of fields associated with the selected second document class;
   displaying at least a portion of the second plurality of fields;
   receiving user input through the user interface selecting at least a second field of the second plurality of fields to be highlighted for a second temporary duration in the selected second document class, wherein the at least a second field is displayed un-highlighted after expiration of the second temporary duration, wherein at least one of the first field is different than the second field or the first duration is different than the second duration;
   saving an indication of the temporary highlighting of the at least a second field for the second document class;
   receiving a request to view a document of the first document class;
   retrieving the saved indication of the temporary highlighting; and
   highlighting the at least a first selected field of the document of the first document class for the first temporary duration.

2. The method of claim 1, wherein the at least a first field is selected and assigned for a first application that is capable of rendering the first document class, the method further comprising carrying out the selecting and saving for a second application capable of rendering the first document class.

3. The method of claim 1, wherein one or more rules specify the temporary duration.

4. The method of claim 1, wherein at least a first rule indicates use of highlighting of a value of the at least a first selected field based on whether the value exceeds a threshold value specified for the at least a first selected-field.

5. The method of claim 1, wherein the temporary duration is a number of seconds specified according to one or more rules.

6. The method of claim 1, wherein the user input selecting the at least a first field and at least a second field is associated with a first user, further comprising receiving user input from a second user removing the selection of the first field to be highlighted for a temporary duration.

7. The method of claim 6, wherein the second user is an end user.

8. The method of claim 1, wherein the at least a first field comprises a plurality of fields and one or more rules specify a duration for which to highlight values of the plurality of fields of the at least a first field for temporary durations, wherein the durations differ between the plurality of fields of the at least a first field.

9. The method of claim 1, further comprising:
   receiving user input through the user interface specifying a rule for the first temporary duration, the user input specifying the first temporary duration or one or more values to be analyzed to determine whether the temporary highlighting should be applied to the first field.

10. The method of claim 9, wherein the user input specifying the rule specifies one or more values, at least one of the one or more values being a value associated with the first field.

11. The method of claim 9, wherein the user input specifying the rule specifies one or more values, at least one of the one or more values being a value other than a value associated with the first field.

12. A computing device adapted to perform a method of highlighting at least one field of a document, the method comprising:
  generating a user interface providing access to a plurality of data fields for each of a plurality of document classes, the plurality of data fields capable of being assigned a rule setting a temporary highlighting for a selected field of the plurality of fields;
  receiving user input through the user interface selecting a first document class of the plurality of document classes;
  retrieving a first plurality of fields associated with the selected first document class;
  selecting a first user role identifier from a plurality of user role identifiers;
  receiving user input through the user interface specifying at least a first field of the first plurality of fields to be highlighted for a first temporary duration when a user role identifier associated with a user viewing a document of the first document class matches the first user role identifier, the at least a first rule specifying that the at least a first selected field is to be highlighted for a first temporary duration, wherein the at least a first selected field is to be displayed un-highlighted after the expiration of the first temporary duration;
  saving the at least a first assigned rule and its association with the at least a first field of the first document class and the first user role identifier;
  selecting a second user role identifier from a plurality of user role identifiers;
  receiving user input through the user interface specifying at least a second field to be highlighted for a second temporary duration when a user role identifier associated with a user viewing a document of the first document class matches the second user role identifier, the at least a second rule specifying that the at least a second selected field is to be highlighted for a second temporary duration, wherein the at least a second selected field is to be displayed un-highlighted after the expiration of the second temporary duration, wherein at least one of the at least a second field and the second temporary duration is different than the at least a first field or the first temporary duration;
  saving the at least a second assigned rule and its association with the at least a second field of the first document class and the second user role identifier;
  receiving a request from a user to view a document of the first document class, the user associated with the first user role identifier;
  determining that the user has the first user role identifier;
  determining that the document is of the first document class;
  retrieving the at least a first rule based on the determining that the user has the first user role identifier and the document is of the first document class;
  selectively highlighting the at least a first field according to the at least a first rule, wherein the at least a first field is selectively highlighted for the first temporary duration; and
  after the first temporary duration has ended, un-highlighting the at least a first field according to the at least a first rule.

13. The computing device of claim 12, wherein the temporary duration is a number of seconds specified according to the at least a first rule.

14. The computing device of claim 12, wherein the at least a first rule includes a comparison to a threshold value, and wherein the highlighting depends on results of the comparison.

15. The computing device of claim 12, wherein the selective highlighting is carried out upon opening the document requested by the user.

16. The computing device of claim 12, wherein the selective highlighting is carried out upon receipt of user input moving a pointer of the user interface over the at least a first field.

17. The computing device of claim 12, wherein the selective highlighting is carried out upon receipt of user input of a combination of key presses.

18. The computing device of claim 12, wherein the at least a first field comprises a second plurality of fields and one or more rules specify an order in which to highlight values of the second plurality of fields for temporary durations associated with the second plurality of fields, respectively, and wherein the number of seconds differs between the second plurality of fields.

19. A method of configuring automated highlighting of at least one selected field of a document, the method comprising:
  generating a user interface providing access to a plurality data fields for each of a plurality of documents classes, the plurality of data fields capable of being assigned a rule setting a temporary highlighting for a selected field of the plurality of data fields;
  receiving a request from a first user through the user interface to define a highlighting policy for a first document class of the plurality of document classes, the highlighting policy comprising at least a first rule for temporarily highlighting at least a first field of the first document class, the at least a first rule specifying how the at least a first field is to be highlighted for a first temporary duration, wherein the at least a first field is to be displayed un-highlighted after the expiration of the first temporary duration;
  saving the first highlighting policy;
  receiving a request from a second user through the user interface to view the highlighting policy, the second user being different than the first user;
  retrieving a first plurality of fields associated with the selected first document class, the retrieved fields comprising the at least a first field;
  receiving from the second user input through the user interface to remove or disable the first rule;
  receiving from the second user user input through the user interface to apply at least a second rule to the first document class, the at least a second rule specifying how a second field is to be displayed as highlighted for a second temporary duration, where the at least a second field is to be displayed un-highlighted after the expiration of the second temporary duration and at least one of the at least a second field and the second temporary duration is different than the at least a first field or the first temporary duration;
  saving the highlighting policy for the first document class;
  receiving a request from the second user to view a document of the first document class;
  retrieving the saved at least a second rule; and
  highlighting the at least a second selected field of the document of the first document class for the second temporary duration according to the at least a second rule.

20. A non-transitory computer-readable medium storing computer-executable instructions for causing a processor programmed thereby to perform a method comprising:

receiving a request from a first user to open a document;

retrieving at least a first rule specifying how to highlight at least a first field of the document for a first temporary duration, wherein the at least a first field is displayed un-highlighted after the expiration of the first temporary duration;

receiving first user input from the first user to suspend the first temporary duration;

displaying the at least a first field as highlighted in response to the first user input;

receiving second user input from the first user cancelling the suspension of the first temporary duration; and displaying the first field as highlighted based at least in part on the second user input.

21. The non-transitory computer-readable medium of claim 20, wherein a given rule of the one or more rules controls highlighting of the value of the at least one selected field based on whether the value exceeds a threshold value specified for the at least one selected field.

22. The non-transitory computer-readable medium of claim 20, wherein the first user input comprises receipt of user input moving a pointer of a graphical user interface over the at least a first field.

23. The non-transitory computer-readable medium of claim 20, wherein the first user input comprises receipt of user input moving a pointer of a graphical user interface over a button or icon.

24. The non-transitory computer-readable medium of claim 20, the method further comprising determining an identity of a class of documents associated with the document and wherein retrieving at least a first rule comprises retrieving one or more rules associated with the first user and the class of documents and specifying how to highlight the at least a first field.

* * * * *